W. HOOPES.
PROCESS OF MAKING ALUMINUM NITRID AND OTHER CHEMICAL SUBSTANCES.
APPLICATION FILED SEPT. 19, 1919.

1,393,370.

Patented Oct. 11, 1921.

W. HOOPES.
PROCESS OF MAKING ALUMINUM NITRID AND OTHER CHEMICAL SUBSTANCES.
APPLICATION FILED SEPT. 19, 1919.

1,393,370.
Patented Oct. 11, 1921.
5 SHEETS—SHEET 3.

Inventor:
William Hoopes,
by Emery, Booth, Janney & Varney
Attys.

UNITED STATES PATENT OFFICE.

WILLIAM HOOPES, OF PITTSBURGH, PENNSYLVANIA, ASSIGNOR TO ALUMINUM COMPANY OF AMERICA, OF PITTSBURGH, PENNSYLVANIA, A CORPORATION OF PENNSYLVANIA.

PROCESS OF MAKING ALUMINUM NITRID AND OTHER CHEMICAL SUBSTANCES.

1,393,370.   Specification of Letters Patent.   Patented Oct. 11, 1921.

Application filed September 19, 1919. Serial No. 324,764.

*To all whom it may concern:*

Be it known that I, WILLIAM HOOPES, a citizen of the United States of America, and a resident of Pittsburgh, in the county of Allegheny and State of Pennsylvania, have invented an Improvement in Processes of Making Aluminum Nitrid and other Chemical Substances, of which the following description, in connection with the accompanying drawings, is a specification, like characters on the drawings representing like parts.

This invention relates to processes involving chemical reactions, and more particularly to those involving chemical reactions between solid and gaseous bodies.

In practising processes of the general character described, the solid bodies that are to take part in the reaction are usually mixed to form a charge and the gas is caused to act upon the latter.

In proceeding in this manner I have found that in order successfully to practice processes of this kind it is necessary to realize certain conditions, particularly if the process is to prove a commercial success. One of these conditions is that the bodies both solid and gaseous, which are to take part in the reaction, shall all come into intimate contact with each other throughout the entire charge, and to this end it is necessary that the bodies both solid and gaseous be as evenly distributed as practicable throughout the latter. Furthermore, where heat is absorbed by the reaction, another condition is that the heat be supplied or distributed at the reaction temperature throughout the mass and that the mass be maintained at the requisite temperature during the reaction. In order to realize these conditions the solid materials forming the charge should be thoroughly intermixed and the charge should be of such a character that fresh gas can permeate the entire mass to take the place of that absorbed, that any gaseous product of the reaction may pass off, and that the heat absorbed by the reaction be supplied at or above the reaction temperature at all points where the reaction is taking place.

Failure to realize these conditions heretofore has resulted in the failure of many processes which otherwise would have proved a commercial success.

My invention has for its principal object to provide a process realizing the conditions above set forth, as well as others that will be in part obvious and in part pointed out hereinafter.

My invention and its aims and objects will be best understood from the following description of the best mode or manner known to me for practising my improved process, taken in connection with the accompanying drawings of one illustrative form of apparatus adapted for carrying out said process, the invention in its true scope being set forth by the appended claims.

In the drawings:—

Fig. 3 is a top plan view of the apparatus shown in Fig. 1;

Fig. 3ª is an elevation of one of the top electrodes and of the means of suspending the same;

In practising my process I prepare the charge of solid materials so as to insure an intimate, and so far as practicable, uniform contact between said solid materials and between the latter and the gaseous body used in the reaction, throughout the entire charge. To this end I preferably reduce the solid materials composing the charge to a relatively finely comminuted state, if they are not already in that condition, and thoroughly mix them together, and with the mixture thus obtained I also preferably thoroughly mix a suitable binder. While any suitable binding material may be used for this purpose, I preferably use a material that will serve to bind the particles of the charge when it is heated. When the charge contains carbon as a requisite and substantial portion thereof, a suitable binding material is tar or pitch. If pitch is used it will preferably be reduced to substantially the same degree of fineness as the other materials forming the charge.

The mixture thus obtained, and forming the charge, will preferably be loosely poured. I have found that an uncompressed charge of this kind, when loosely poured, has a much greater permeability to gases than any other form of charge heretofore known to me. This is particularly true where pitch is used in the mixture. When subjected to the action of the gaseous body, therefore, such a loosely poured charge will be permeated throughout its entire mass by the gaseous body, thus insuring intimate contact between the solid and gaseous bodies throughout the entire charge, and that the reaction will take place in all parts thereof. I preferably render the charge self-sustaining. To this end I heat the loosely poured charge, whereby most of the volatile combinations of the tar or pitch are driven off and the fixed carbon remaining from the distillation of the binder binds the particles of the charge to each other, thus rendering the whole mass self-sustaining. Furthermore, the distillation of the binder tends to add to the porosity of the charge. In some cases it may be desirable to core the charge to facilitate the permeation of the latter by the gas.

The gas is now passed through the charge permeating the latter in all its parts, so that the reaction takes place throughout the entire mass. Heat may be applied to the charge in these cases in which it is necessary to the reaction or to further the latter. Heat may thus be applied by any suitable means and in any suitable manner, but I preferably use electrical energy for this purpose, proceeding preferably on the resistance principle of heating, the charge forming a conducting path between suitable electrodes connected to any suitable electricity supply.

The heat is thus developed with practical uniformity throughout the cross-section of the charge, a condition required for the maintenance of uniform temperature while performing the reaction. The use of arcs adjacent the charge for developing the heat, or even of arcs where the charge constitutes one terminal of the arc, has proven unsatisfactory, as the major portion of the heat is developed in the arc with the production of local high temperature at that point instead of uniform temperature throughout the entire charge. The same thing in a lesser degree applies to the development of the heat by means of resistors placed external to the charge. In that case the resistors must run at a higher temperature than is maintained within the charge, and the portions of the charge adjacent the resistors are heated to higher temperatures than those portions of the charge farther removed from the resistors, with the result that, if the portions of the charge adjacent the source of the heat are at the proper temperature for the reaction, those portions of the charge farther removed from the source of heat are at too low a temperature for the reaction, or conversely, if the portions of the charge far removed from the source of the heat are maintained at the proper temperature for the reaction, then those portions of the charge adjacent the source of heat are overheated, with resulting volatilization or fusion of the mass.

Owing to the even distribution of the gas throughout the entire charge, and the relatively uniform structure of the latter, the electric current will be uniformly distributed throughout the entire charge when a strongly endothermic reaction is proceeding, and it is possible to supply electric energy to all parts of the charge as fast as it is absorbed, thus securing a uniform and thorough reaction in all parts of the charge. The reaction once started, the gas having free access to the entire mass of the charge makes it possible to increase the amount of energy applied to supply the heat required by the reaction, without any further substantial rise of temperature so long as the reaction is progressing. When the reaction is completed, which will be indicated by a persistent rise in temperature from the temperature or range of temperature at which the desired reaction takes place, the electric current is cut off and the charge allowed to cool.

The materials used in carrying out certain reactions will not be naturally conductive and in such case I provide means for imparting to the charge the necessary conductivity. This I may do by any suitable means or in any suitable manner, as for example by mixing with the charge any suitable substance possessing the required electrical conductivity. The materials used in certain reactions are non-conductive when cold or at the normal temperature of the atmosphere, but become conductive on being heated. In such case I preheat the charge. This I may do in any suitable manner or by any suitable source of heat, but I preferably employ for this purpose an electrical resistor suitably disposed in relation to the charge, so as to heat the same as uniformly as practicable throughout the entire mass, thus to insure that when the electric current for the production of the reaction is passed through the charge, it shall be distributed through all parts thereof and that the reaction shall take place throughout the entire charge.

I will now describe more in detail the best mode or manner now known to me for practising my novel process, in its application to the production of a specific substance, more particularly aluminum nitrid. It is to be understood, however, that my process is not limited to the production of this substance, but that, as to its general features and also as to certain of its more specific features as well, it is equally applicable to the production of other substances, including other nitrids.

Any suitable apparatus may be used to practise my process, but as shown in the figures, I preferably use a shaft furnace, the walls 2 of which may be either polygonal, circular, or square. Herein they are shown as circular. These walls may be of any suitable material, such as fire-brick, silica, magnesite, or bauxite brick. The bottom wall 4 of the furnace of the same material is provided with an annular space 6 which is covered by a grate 8. A plurality of pipes 10 extend radially through the lateral wall 2 of the furnace beneath the grate 8, their inner ends opening into the annular space 6, and their outer ends being connected with a common supply pipe 12 extending about the lower part of the furnace and itself connected to a larger supply pipe 14 leading to any suitable source of supply of nitrogen or nitrogen-containing gas. Herein six pipes 10 are provided, but the number may vary according to the size of the furnace. Through these pipes 10 the nitrogen or nitrogen-containing gas to be used in the reaction is introduced into the furnace.

Figures 3, 3A:
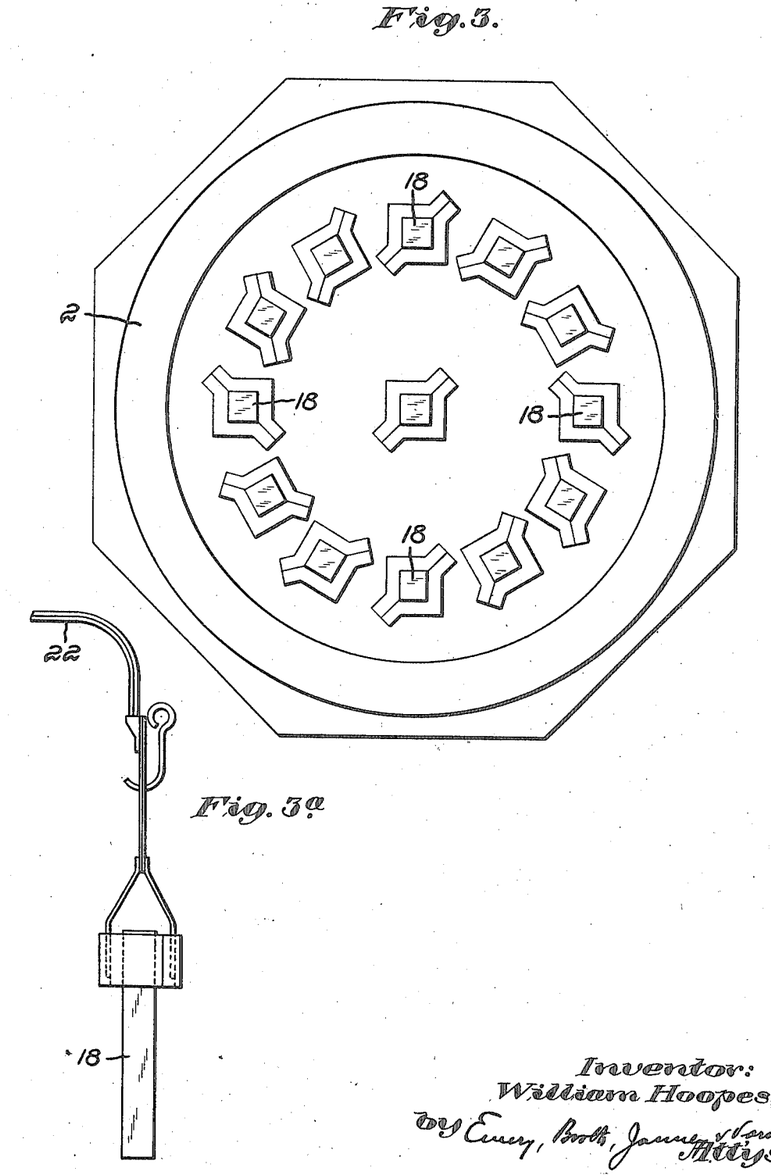
Figure 4:
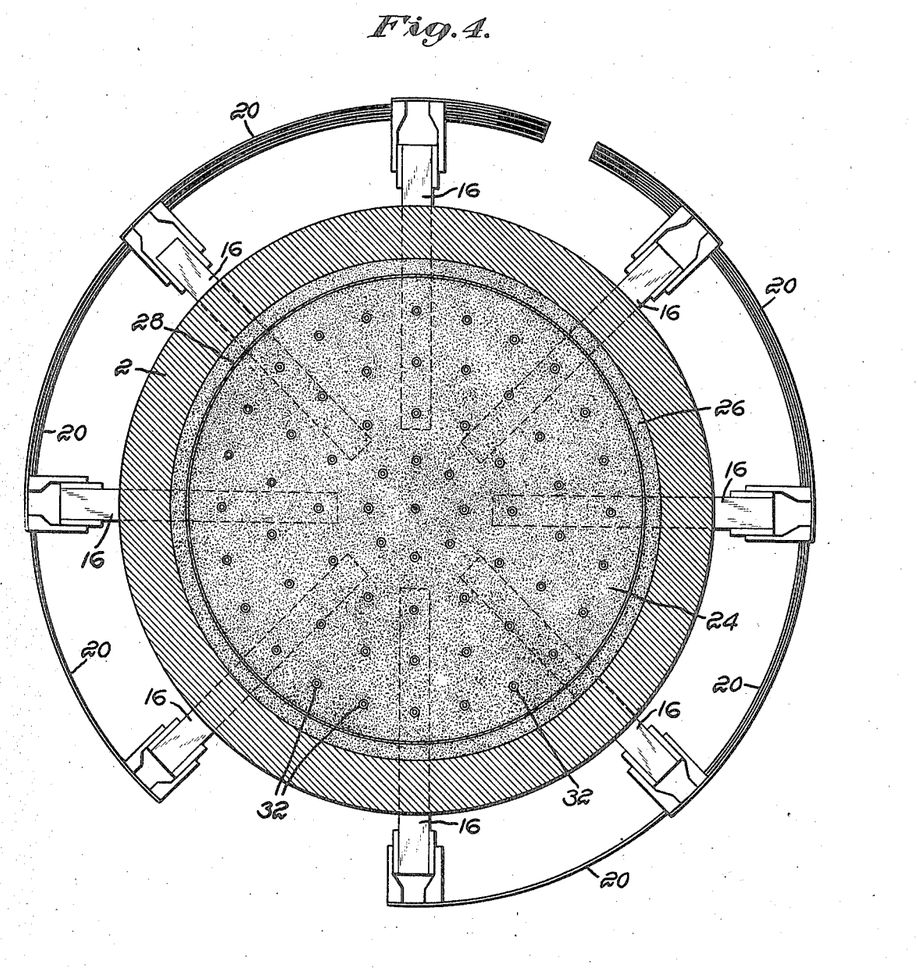
Fig. 4 is a horizontal cross-section on line 4—4 of Fig. 1.
Figure 5:
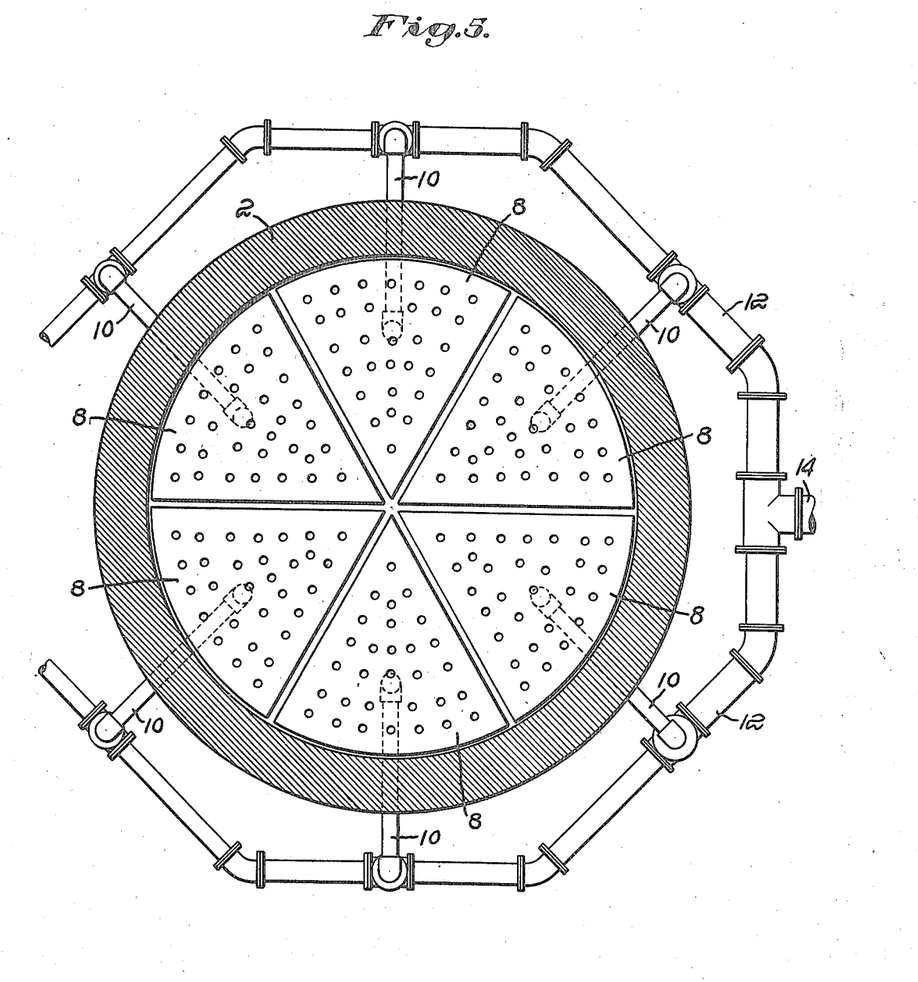
Fig. 5 is a horizontal cross-section on line 5—5 of Fig. 1, certain parts being shown in elevation.

Through the lateral walls 2 of the furnace, near the bottom of the latter but above the grate 8, there extend horizontally a plurality of electrodes 16, and above the furnace there are suspended in any suitable manner a plurality of vertically disposed electrodes 18. All of these electrodes will preferably be of carbon, eight lower electrodes 16 and thirteen upper electrodes 18 being herein provided, but the number of electrodes used will vary according to the size of the furnace used, it being preferable to use as many electrodes as may be conveniently handled in order uniformly to distribute the current through the furnace. The upper electrodes 18 will preferably be disposed in a circle with one in the center, substantially as shown in Fig. 3, but any suitable arrangement may be adopted. These upper electrodes will preferably be suspended separately, so that each may be raised and lowered independently of the others, as exemplified in the case of one electrode in Fig. 3$^a$, for a purpose hereinafter more fully described.

The lower electrodes 16 are supplied with current through suitable connections 20 located outside the furnace, and the upper electrodes 18 are supplied with current through the connections 22. These connections 20 and 22 are connected to the terminals, not shown, of an electric circuit supplied from any suitable source of electricity. While any suitable current, either direct or alternating, may be used, I preferably use an alternating current supplied by a transformer, not shown, of any suitable construction, the primary circuit of which will preferably be provided with means for regulating the voltage delivered by the transformer to the furnace.

Upon the grate 8 I provide a layer of any suitable electrically conductive material in which the lower electrodes 16 are embedded within the furnace. For this purpose I may use granulated coke, the lower portion 21 of the layer being preferably of coarse coke and the upper portion 23 of said layer of relatively fine coke.

Upon this layer of coke is supported, within what may conveniently be called the reaction chamber of the furnace, the mixture or charge of solid materials that are to take part in the reaction. For the production of aluminum nitrid I prefer to use calcined bauxite, mixed with a suitable proportion of a reducing agent, to which will preferably be added a material which will serve to bind the particles of the charge when it is heated. Instead of bauxite any aluminous material could be used, such as for example, as the aluminous residue from alunite after the extraction of the potash therefrom, or kaolin or any clay of high alumina content. The amount of silica contained in clays, however, makes them commercially undesirable for use in the process, although it is possible to use them. A suitable binding material is tar or pitch. If pitch is used, it is convenient to use it in a pulverized form and to mix it with the bauxite and reducing agent at the time those two materials are mixed, so that the whole goes into the furnace as a dry mixture. Any suitable reducing agent may be used but I preferably use a carbonaceous material, such as coke or low-ash bituminous coal.

In order to facilitate the penetration of the nitrogen gas through the mixture, and permit the necessary contact between the reagents, it is preferable to reduce the ingredients of the charge to a relatively finely comminuted state. I have found that, if they are ground to a fineness which will enable about 80% of the whole charge to pass through a 100-mesh sieve, this will suffice. After grinding, the ingredients are thoroughly mixed in any suitable proportion. I have found that a satisfactory mixture will consist of the following proportions: 100 pounds of bauxite; 50 pounds of any good low-ash bituminous coal; and 10 pounds of powdered pitch, but I do not limit myself to those exact proportions.

I prefer to use pitch instead of tar, as tar makes the mixture heavier and therefore less permeable to gases. I also preferably make up the charge as a loose mixture, without compressing it, thus minimizing the density and gaining in permeability to gases. The degree of porosity of a charge, and of its consequent permeability to gases, is in inverse ratio to its weight per unit volume. A mixture of finely ground bauxite coal or coke, and powdered pitch, when loosely poured, weighs only from 40 to 50 pounds per cubic foot, and I have found that a loosely poured dry mixture of these ingredients has a much greater permeability to gases than any other form of charge known to me.

It is preferable to separate the charge from the furnace walls or keep it out of contact with the latter, in order among other things to insulate the charge from the walls of the furnace and reduce the loss of heat from the charge by radiation through the furnace walls. Furthermore, the charge herein used for the production of aluminum nitrid is electrically non-conductive when cold and must be heated to be rendered conductive.

Figure 1:
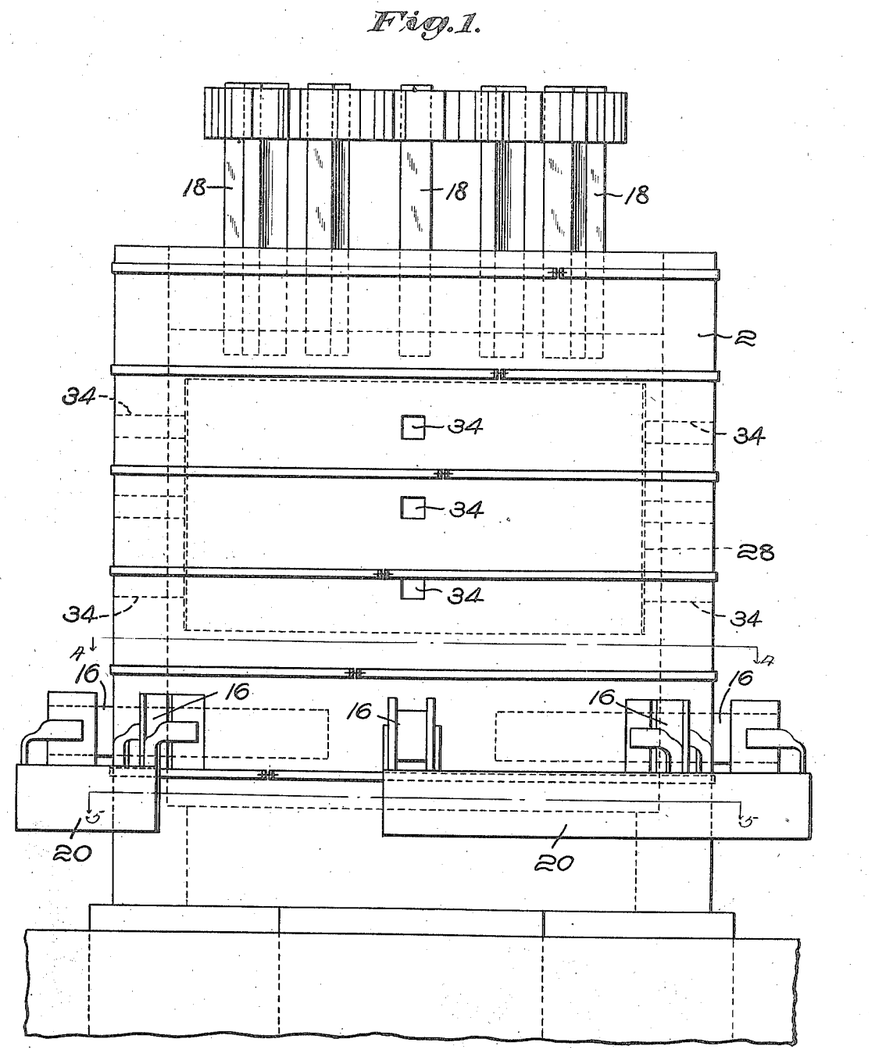
Figure 1 is a front elevation of one illustrative form of apparatus for practising my process.
Figure 2:
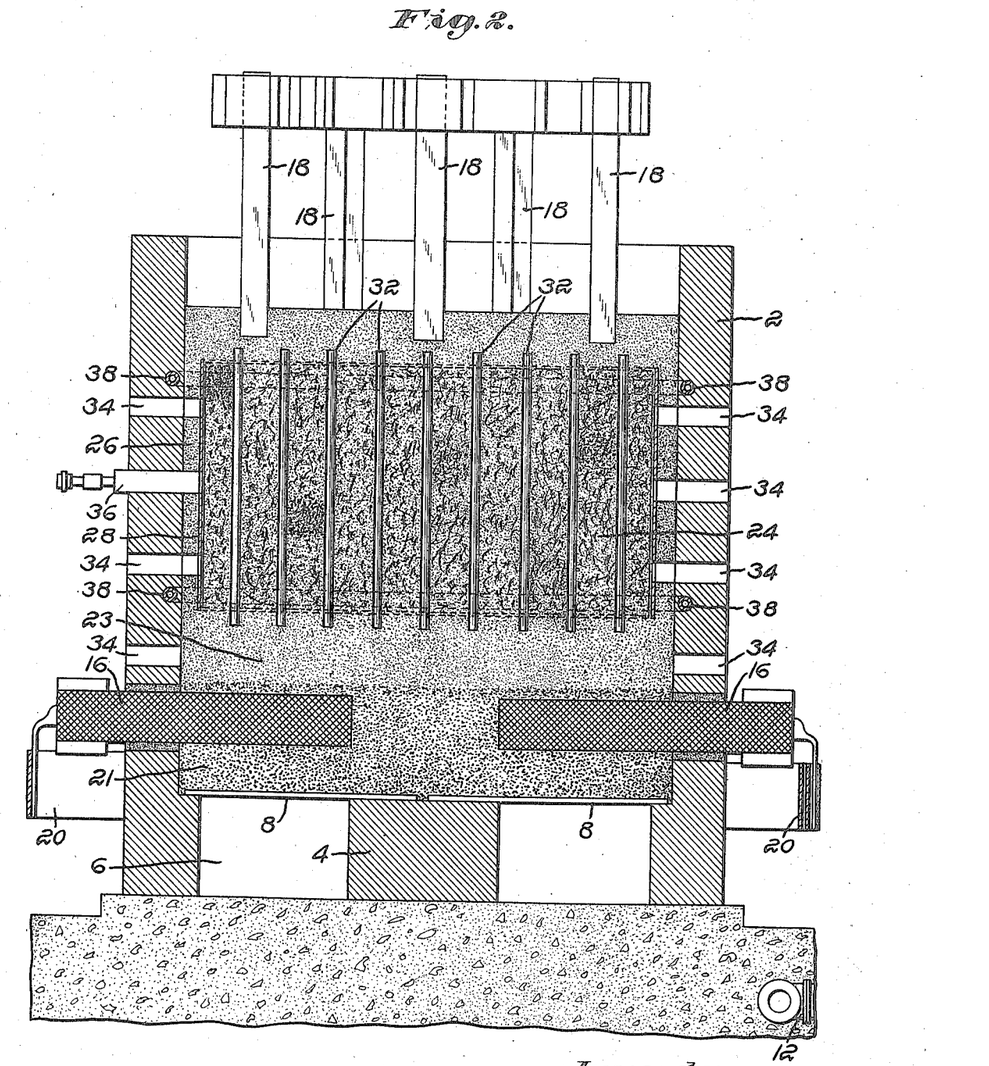
Fig. 2 is a central vertical section of the apparatus shown in Fig. 1.

To the above ends I preferably interpose between the charge and the walls of the furnace a layer of any suitable material capable of withstanding the relatively high temperature to which the interior of the furnace is exposed during the reaction, and for this purpose I preferably select a substance that will be relatively conductive when cold, which will therefore act as a resistor when an electric current is passed through the same, and thus heat the charge. Certain carbonaceous substances give good results when used for this purpose. I have found that granulated coke for example is well suited for this purpose, and I therefore preferably interpose between the charge 24 and the walls of the furnace a layer 26 of this material (see Fig. 2). In carrying out my invention, however, I may use any suitable substance or means for this purpose.

Where the charge must be preheated in the furnace to render it self-sustaining, this surrounding layer 26 acts as a supporting means or envelop for the charge to support it until it becomes self-sustaining.

It will be apparent that where the charge is made up of materials that render it electrically conductive when cold or at normal temperatures, the surrounding envelop 26 need not consist of electrically conductive material. Any suitable material or other means that can withstand the high temperature during the reaction, and which is preferably heat-insulating, may be used.

As already stated, the charge rests upon the layer of granulated coke in which the lower electrodes are embedded, and with which the charge is therefore in electrical contact. To facilitate the introduction of the charge 24 and its surrounding envelop 26 without their becoming intermixed, I preferably use a cylindrical form 28 having a diameter somewhat less than the interior diameter of the furnace. This form is set up vertically, substantially axially with the furnace, thus leaving an annular space between it and the furnace walls. This annular space will vary somewhat in thickness according to the diameter of the furnace; in a furnace having an interior diameter of seven feet the cylindrical form may be approximately five feet in diameter, thus leaving an annular space of approximately one foot in thickness between it and the outer walls of the furnace.

The interior of the form is now filled in with the charge, and the annular space with the granulated coke or other material that is to constitute the supporting envelop. This form may be made of any suitable material, such as cardboard for example, in which case it will be consumed during the operation if left in; or it may be withdrawn as the charge and envelop are filled in upon opposite sides thereof, as when the envelop and charge are once in place they have no further tendency to mingle.

The furnace is thus filled with the charge on the inside of the form and granulated coke on the outside to the level of the top of the form. Above the top of the form is added a layer of electrically conductive material 30, granulated coke for example, like the layers 21, 23, in which are embedded the lower ends of the carbon electrodes 18.

The top coke layer 30 may, if desired, be confined to the space within the form, the envelop material running to the top of said coke layer.

In order to facilitate and expedite the reaction it is sometimes desirable to core a gas passage or gas passages through the charge in the furnace, so that the nitrogen can more readily permeate the whole charge. This may be effected in any suitable manner or by any suitable means, as by setting up tubes or rods 32 of any suitable material within the form 28 before the charge is introduced, and filling the latter in around the tubes 32, which should be suitably spaced apart, about 12 inches for example. These tubes or rods may be made of paper, wood or any other suitable material and of any shape in cross-section.

The furnace walls will preferably be provided with a plurality of sight-tube holes 34, placed at different heights and in different angular positions around the furnace. In the furnace shown, there are four vertical series of these sight-tube holes placed 90° apart around the furnace. A tube extending into the interior of the charge may be inserted in these sight-tube holes, as shown at 36, by means of which the temperature of the interior may be read at any time, by either the insertion of a thermo-couple or the use of an optical pyrometer, the choice of the means for reading temperature being governed by the ranges of temperature to be read. The temperature of practically all parts of the charge may thus be ascertained at any time.

After the furnace has been charged, as above described, current is thrown on from the transformer. As above stated, the charge of bauxite, coal and pitch, used in the present illustrative instance, does not conduct when it is cold, but the top layer of coke 30, the lower layer of coke 21, 23, and the annular envelop of coke 26, connecting these upper and lower layers, do conduct, so that the circuit is completed between the upper and lower electrodes by the continuous path of coke thus formed. The first effect of turning on the current is therefore to develop heat in the coke forming the top and bottom coke layers 30 and 21, 23 and the annular coke envelop 26 surrounding the charge, and as the temperature of this envelop can be raised to any desired extent, the preliminary heating of the charge is thus effected by heat conducted into it from the points where it is generated. This heating will preferably be effected relatively slowly and may occupy a period of from five to six hours in a furnace of the size above referred to, the primary object being the melting and distillation of the pitch which has been added to the charge to serve as a binder, and the distillation of the coal used in the charge.

By the time the temperature of the charge has thus been raised to about 700° C., most of the volatile components of the pitch and coal will have been driven off, and the fixed carbon remaining from this distillation binds the particles of the charge to each other, so that the whole mass of the charge is self-sustaining and needs no further support, either from the outside coke layer or from the tubes, in order to retain its form. Approximately at this point the charge itself begins to conduct the current, so that during the subsequent operation the charge itself serves to establish the circuit between the top and bottom coke layers.

If coring tubes of wood or paper have been used, during the heating throughout the mass these will begin to distil and decompose before the baking of the charge is completed, but it is found that the charcoal resulting from the use of such tubes holds the position it occupied in the original tube and furnishes a sufficient barrier to prevent the charge from falling into and stopping up the core-holes. After the baking of the charge to a self-sustaining mass is completed, the temperature of the charge continues gradually to rise until the reaction temperature is reached. Before this temperature is reached the nitrogen will be turned on, so that it may penetrate and pass up through the charge. In so doing it becomes heated in passing through the coke layer 21, 23, and this contributes to heating the charge. The reaction begins and proceeds very slowly at a temperature of about 1400° C., but its speed rapidly increases as the temperature rises above that point, and it proceeds with a rapidity sufficient to make the process commercial at temperatures between 1600 and 1700° C. The rapidity of the reaction increases very rapidly with a rise in the temperature above 1650° C. The conductivity of the charge relative to the conductivity of the coke envelop also increases very greatly with the rising temperature, and at the reaction temperatures actually used the major portion of the current in the furnace passes through the charge and develops the heat where it is required to supply that which is absorbed by the reaction, which latter is highly endothermic.

After the charge is brought to the reaction temperature it is necessary to continue to supply it with energy until enough energy in excess of that lost by convection, conduction, and radiation has been supplied to it to convert the major portion of the alumina in the charge to nitrid. After this amount of energy has been supplied, any further input of energy ceases to be useful and will result in a further rise of temperature in the charge which, if continued, will destroy the nitrid already formed. During the progress of the reaction, which in a seven-foot furnace may take from about five to seven hours, the rise of temperature is arrested by the fact that the energy supplied is absorbed by the reaction and disappears as heat. In practice, it is found that while the reaction is going on the charge is automatically retained at a temperature in the neighborhood of 1700° C., unless energy be supplied to the charge faster than it can be absorbed by the reaction, which should not be done for good operation. When the temperature rises to the neighborhood of 1900° C., the supply of current will be discontinued, as this rise in temperature is indicative of the completion of the reaction and because also above this temperature very rapid volatilization of alumina takes place, and decomposition of the nitrid formed begins.

If charcoal-forming coring tubes have been used the charcoal may or may not remain in place, but if it does it will do no harm because the charcoal is sufficiently permeable to the gas not to interfere with the entrance, nor with the penetration of the charge by the nitrogen.

After the current is turned off the supply of nitrogen will preferably be continued, as the reaction will not stop when the current is turned off if there is any unconverted alumina still remaining in the charge, but will continue until the temperature of the charge has fallen to a point in the neighborhood of 1400° C. Continued introduction of the nitrogen after the current is turned off also serves to prevent the diffusion of air through the charge, which diffusion might have the effect of oxidizing some of the aluminum nitrid already formed. It also helps to cool the charge.

While pure nitrogen could be used in the reaction, this would be expensive, and the use of pure nitrogen is not necessary. An atmosphere consisting of approximately 95 to 98% nitrogen with some carbon dioxid, some carbon monoxid, and a small quantity of free oxygen can be cheaply made and supplied. This gas is found to be entirely suitable. Ordinary producer gas can also be used to good advantage, but its high carbon dioxid and carbon monoxid content make it less desirable than an atmosphere richer in nitrogen. Any carbon dioxid present in the gas is reduced to carbon monoxid by the carbon of the coke in the bottom of the furnace and by the carbon in the charge, but as this conversion is an endothermic reaction, it takes place at the expense of electrical energy, and for this reason it is desirable that the carbon dioxid content of the gas used shall be as low as practicable. Any oxygen in the gas turns to carbon dioxid with the carbon at the bottom of the furnace and afterward is reduced to carbon monoxid at the expense of electrical energy. While the presence of carbon monoxid to a reasonable amount does not interfere seriously with the reaction, yet when this carbon monoxid content of the gas rises to approximately 60% or above, it does begin to interfere materially with the reaction. Inasmuch as the reaction itself is productive of large quantities of carbon monoxid, the proportion of that gas to the nitrogen content of the atmosphere used rises to a deleterious point sooner than when gas having a very high nitrogen content or a low carbon monoxid content is used. For this reason a much greater volume of producer gas is required by the furnace than would be required if pure or nearly pure nitrogen were used.

It will be apparent that when the furnace charge is brought to reaction temperature, the total quantity of energy passing through the furnace divides in its passage between the charge and the coke envelop. The portion of the energy which passes through the envelop serves to supply the heat lost by radiation and conduction through the furnace walls, permitting all the energy which is developed within the charge itself to be usefully applied in causing the reaction to proceed. The carbonaceous envelop surrounding the charge, therefore, serves this useful purpose in addition to those already enumerated.

At the temperature necessary to maintain within the furnace for carrying out the reaction, the interior walls of the furnace reach a temperature at which they themselves become conductors of the electric current. The result of this is that a portion of the current may leak wastefully around the charge along the interior surface of the walls of the furnace, from the top coke layer to the bottom coke layer. This both wastes energy and contributes to the damage of the furnace walls. Means are accordingly herein provided to overcome this, said means being herein exemplified, for example, by two water coils 38, 38, see Fig. 2, embedded in the wall of the furnace, adjacent its inner surface, one of said coils being located just below the upper layer of coke 30, and the other just above the lower layer of coke 23. Through suitable connections, not shown, a circulation of cold water from any suitable source of supply, not shown, may be maintained through these coils, whereby the walls of the furnace, for a sufficient distance inward from their inner surface, will be maintained at a sufficiently low temperature where said coils are located, to prevent leakage of electric current around the charge, along the interior surface of the furnace The carbonaceous envelop protects the charge during the reaction, so that the furnace may be operated without a top, as the charge is protected on all sides by the carbonaceous shield which prevents air from filtering into it and oxidizing it.

In starting a furnace of the character described, particularly if it be a large one, certain precautions are found to be desirable in practice. Carbon or coke has a much higher electrical resistance when cold than when hot; consequently, when the current is first applied, if any portion of the envelop happens to be of less resistance than the balance thereof, more current passes through that portion than through the portions of higher resistance, and heating proceeds more rapidly at that point than at the other points. As the temperature in these zones of less resistance rises, the resistance tends to diminish still more, and the quantity of current admitted therefore becomes still greater, so that the effect is cumulative. The tendency is therefore for the envelop to heat up at one point faster than at other points, and this effect is also cumulative. For this reason it is desirable that the initial heating shall proceed slowly, so that no point in the furnace shall be supplied with energy more rapidly than it can be conducted to the neighboring colder portions to equalize temperatures. The uniform heating of the envelop can be facilitated by various means. In practice it has been found that this may be accomplished, for example, by dividing the coke layer at the top of the furnace into sections, electrically insulated from each other, and each one supplied with current by a separate electrode. This sectionalizing can be readily effected by any suitable means, as by dividing the top coke layer into sectors, by boards or partitions. The entire annular envelop may also be divided in this way so as to confine the current to the sector in which it starts, but in practice this has been found to be unnecessary. The amount of current entering any sector can be controlled in any one of several ways, as will be clear to those skilled in the art, for example by a variable reactance or resistance in the circuit of each electrode, but preferably by varying the pressure of the electrode on the coke which it enters. The electrical resistance of a mass of loose coke is very greatly reduced by increasing the contact pressure on it, and in practice it has been found desirable, as already stated, to suspend the electrodes separately, with means to raise or lower them independently, so as to be able to increase or decrease the intimacy of contact between the individual electrodes and the coke.

Thus, if it is found in starting that one electrole is carrying more current than the others, this current can be decreased by slightly raising the electrode, and conversely, any electrode which is carrying too little current can be lowered to raise the amount of current it carries. In practice, the electrodes will preferably be thus adjusted separately until all conduct about the same amount of current, after which the supply of current may be regulated as a whole to keep it at the right amount. The voltage and amperage required for the reaction will vary. In a furnace having a reaction chamber of a diameter of seven feet, for example, from 40 to 120 volts, and 10,000 to 20,000 amperes will be required, according to the height of the charge. After the nitrification of the charge is complete, it is permitted to remain in the furnace while it cools, to prevent its oxidation by the oxygen of the air. After the temperature of the charge has fallen to a point below 800 to 900° C., this oxidation of the nitrid in the charge will no longer take place, and the finished charge can then be removed from the furnace in any suitable manner and by any suitable means.

From what has been said with regard to the liability of the charge oxidizing at the reaction temperature, should oxygen be admitted, it will be apparent that in order to be successful the reaction must be conducted in a reducing atmosphere. This is assured in my process by the presence of the heated carbon in the coke layers 21, 23, which combines with any oxygen that may enter the furnace to form carbon dioxid, which is afterward reduced to carbon monoxid, and also to the presence of large quantities of the latter gas resulting from the reaction.

The charge may be put into the furnace in dry powdered form, as above described, or it may be previously mixed with the tar or pitch, at a temperature high enough to render the binding material thoroughly fluid, and put into the furnace in a plastic or semi-plastic condition. It will also be apparent that the charge could be heated, in a suitable form for example, to render it self-sustaining before placing it in the furnace, and the coring, if used, may also be effected before the charge is placed in the furnace.

From the above description those skilled in the art will readily recognize the advantages possessed by my invention.

Thus, uniform heating of the charge and consequent uniform electrical conductivity throughout all parts of the latter is assured by my invention so long as an endothermic reaction is proceeding, on condition that the materials for the reaction be everywhere present in the charge in quantities and under conditions to enable the reaction to proceed freely in all parts of the charge. This condition my invention fulfils owing to the intimate and substantially uniform intermixture of the ingredients of the charge throughout the entire mass of the latter, and the high degree of porosity of the charge throughout, whereby intimate and so far as practicable uniform contact is assured between the solid and gaseous bodies used in the reaction, throughout the entire mass of the charge, and fresh gas can always permeate any and all parts of the latter to take the place of that absorbed by the reaction. The heat necessary for the reaction will thus be developed throughout the entire charge wherever it is required and in suitable quantity continuously to supply that absorbed by the reaction.

So far as practicable, uniform heating of the charge throughout is thus assured and overheating thereof during the reaction is precluded provided that the rate of input of electrical energy is kept within certain limits, readily determined by experiment; this rate being substantially equal to the sum of the heat absorbed by the reaction, plus the unavoidable heat losses, the temperature being thus maintained within the desired limits.

Where the charge is not substantially uniformly heated, the electric current owing to the greater conductivity of the hotter portions of the charge, is liable to concentrate at said hotter portions. The temperature of the hotter portions of the charge is thus liable to rise to the fusion point of the mixture, the resulting fused masses cutting off the supply of gas from adjacent parts of the charge, thus materially curtailing if not wholly preventing the reaction at those parts. The uniform heating of the charge in accordance with my invention precludes this and insures that the reaction will take place practically uniformly in all parts of the charge, thus insuring a very high production of the product which it is sought to obtain.

Other advantages secured by my invention in addition to those herein specifically pointed out will appear to those skilled in the art.

Obviously this invention is not limited to the specific details of procedure described above for illustration, nor is it limited in its application to any particular apparatus or means for practising the same, although the process embodying the invention is especially well adapted to be practised by the apparatus and means herein described. It is to be understood, further, that it is not indispensable that all the features of the invention be employed in a single process, since the features of the invention may be used to advantage separately, as defined in the subjoined claims. The apparatus herein disclosed is claimed in my companion case of even date herewith, Serial No. 324,762.

Claims.

1. A process involving chemical reactions between gaseous and solid bodies particularly applicable to bodies which are non-conducting when cold characterized by providing a pervious mass of the solid bodies within a resistant conducting envelop and passing an electric current through said envelop and said mass during its penetration by the gaseous body.

2. A process involving chemical reactions between gaseous and solid bodies particularly applicable to bodies which are non-conducting when cold characterized by interposing a pervious mass of the solid bodies between suitable electrodes providing a resistant conducting body between the electrodes indirectly preliminarily to heat said mass and passing an electric current between said electrodes during penetration of said mass by the gaseous body.

3. A process involving chemical reactions between gaseous and solid bodies particularly applicable to bodies which are non-conducting when cold characterized by providing an uncompacted mixture of the solid bodies with a binder, heating the same to provide a porous self-sustaining mass and then passing an electric current through said mass during penetration thereof by the gaseous body.

4. A process involving chemical reactions between gaseous and solid bodies particularly applicable to bodies which are non-conducting when cold characterized by interposing an uncompacted mixture of the solid bodies with a binder within a suitable resistant envelop between electrodes and passing an electric current between said electrodes whereby to fix said binder and also effect a preliminary heating of said charge and then directly to heat said charge during its penetration by the gaseous body.

5. A process involving chemical reactions between gaseous and solid bodies particularly applicable to bodies which are non-conducting when cold characterized by interposing an uncompacted mixture of the solid bodies with a binder between suitable electrodes, providing a resistor between said electrodes to effect preliminary heating of said mixture whereby to provide a self-sustaining charge and passing an electric current between said electrodes during penetration of the charge by the gaseous body.

6. A process involving chemical reactions between gaseous and solid bodies particularly applicable to bodies which are non-conducting when cold characterized by providing a mixture of the solid bodies with a suitable binder and providing consumable core pieces therein, preliminarily heating the mixture to provide a self-sustaining pervious mass and then heating the mass during the penetration thereof by the gaseous body.

7. A process involving chemical reactions between gaseous and solid bodies particularly applicable to bodies which are non-conducting when cold characterized by inclosing a charge of solid bodies in an envelop of lumps of carbon and passing an electric current therethrough during its penetration by the gaseous body.

8. A process involving the production of a compound of nitrogen characterized by heating solid material participating in the reaction during penetration thereof by a nitrogenous gas and exteriorly protecting the solid material with carbon to exclude access of oxygen thereto.

9. A process involving chemical reactions between solid and gaseous bodies characterized by interposing between suitable electrodes a charge of finely divided solid bodies mixed with a suitable binder, heating the charge to set said binder and provide a self-sustaining pervious mass and then heating the charge at reaction temperature by current passed between said electrodes and during penetration thereof by the gaseous body.

10. A process of making aluminum nitrid characterized by interposing between electrodes a mixture of a suitable aluminous material and a suitable carbonaceous material in a finely divided state, said mixture being inclosed within a resistant conducting envelop and passing an electric current between said electrodes during penetration of the material interposed therebetween by a nitrogenous gas.

11. A process of making aluminum nitrid characterized by interposing between electrodes a mixture of a suitable aluminous material and a suitable carbonaceous material in a finely divided state, providing adjacent the same a resistant conducting body whereby said mixture may be preliminarily heated and passing an electric current between said electrodes during penetration of the material interposed therebetween by a nitrogenous gas.

12. A process of making aluminum nitrid characterized by interposing between electrodes a mixture of a suitable aluminous material and a suitable carbonaceous material in a finely divided state and with a suitable binder, heating said mixture to set said binder and provide *in situ* a self-sustaining pervious and conducting charge and passing electric current between said electrodes during penetration of said charge by nitrogenous gas.

13. A process involving chemical reactions between solid and gaseous bodies, which comprises forming the relatively finely comminuted solid bodies, mixed in suitable proportions, into a self-sustaining porous mass, by mixing with said solid bodies a suitable proportion of a binding material that will bind the particles of the mixture together when it is heated, and heating said mixture; coring said mixture; causing the gaseous body to penetrate said self-sustaining mass; and heating said mass to the temperature necessary for the reaction during its penetration by the gaseous body.

14. A process involving chemical reactions between solid and gaseous bodies, which comprises forming the relatively finely comminuted solid bodies, mixed in suitable proportions, into a self-sustaining porous mass, by mixing with said solid bodies a suitable proportion of a binding material that will bind the particles of the mixture together when it is heated, and heating said mixture; coring said mixture; causing the gaseous body to penetrate said self-sustaining mass; and heating said mass to the temperature necessary for the reaction by conducting an electric current through said mass during its penetration by the gaseous body.

15. A process involving chemical reactions between solid and gaseous bodies, which comprises forming the relatively finely comminuted solid bodies, mixed in suitable proportions, into a self-sustaining porous mass, by mixing with said solid bodies a suitable proportion of a binding material that will bind the particles of the mixture together when it is heated, and electrically heating said mixture; coring said mixture; causing the gaseous body to penetrate said self-sustaining and cored mass; and heating said mass to the temperature necessary for the reaction during its penetration by the gaseous body.

16. A process of making aluminum nitrid, which comprises forming a mixture comprising a suitable aluminous material and a suitable carbonaceous material, in a relatively finely comminuted state and mixed in suitable proportions, into a self-sustaining porous and electrically conductive mass, by mixing therewith a suitable proportion of a binding material that will bind the particles of the mixture together when it is heated, and heating said mixture; coring said mixture; causing a nitrogen-containing gas to penetrate said self-sustaining and cored mass; and heating said mass to the temperature necessary for the reaction by conducting an electric current through said mass during its penetration by the nitrogen-containing gas.

17. A process of making aluminum nitrid, which comprises forming a mixture comprising a suitable aluminous material and a suitable carbonaceous material, in a relatively finely comminuted state and mixed in suitable proportions, into a self-sustaining and electrically conductive porous mass, by mixing therewith a suitable proportion of a binding material that will bind the particles of the mixture together when it is heated, and electrically heating said mixture; coring said mixture; causing a nitrogen-containing gas to penetrate said self-sustaining and cored mass; and heating said mass to the temperature necessary for the reaction by conducting an electric current through said mass during its penetration by the nitrogen-containing gas.

18. A process of making aluminum nitrid, which comprises forming a mixture comprising relatively finely comminuted bauxite and coke or coal, mixed in suitable proportions, into a self sustaining porous and electrically conductive mass, by mixing therewith a suitable proportion of pitch or tar, and heating said mixture; coring said mixture; causing a nitrogen-containing gas to penetrate said self-sustaining and cored mass; and heating said mass to the temperature necessary for the reaction by conducting an electric current through said mass during its penetration by the nitrogen-containing gas.

19. A process of making aluminum nitrid, which comprises forming a mixture comprising relatively finely comminuted bauxite and coke or coal, mixed in suitable proportions, into a self-sustaining and electrically conductive porous mass, by mixing therewith a suitable proportion of tar or pitch, and electrically heating said mixture; coring said mixture; causing a nitrogen-containing gas to penetrate said self-sustaining and cored mass; and heating said mass to the temperature necessary for the reaction by conducting an electric current through said mass during its penetration by the nitrogen-containing gas.

20. A process of making aluminum nitrid, which comprises forming a mixture comprising relatively finely comminuted bauxite and bituminous coal, in the proportions of about 100 pounds of bauxite and about 50 pounds of bituminous coal, into a self-sustaining and electrically conductive porous mass, by mixing therewith about 10 pounds of powdered pitch, and heating said mixture; causing a nitrogen-containing gas to penetrate said mass; and heating said mass to the temperature necessary for the reaction by conducting an electric current through said mass during its penetration by the nitrogen-containing gas.

21. A process of making aluminum nitrid, which comprises forming a mixture comprising relatively finely comminuted bauxite and coke or coal, in the proportions of about 100 pounds of bauxite and about 50 pounds of bituminous coal, into a self-sustaining and electrically conductive porous mass, by mixing therewith about 10 pounds of powdered pitch, and heating said mixture; coring said mixture; causing a nitrogen-containing gas to penetrate said self-sustaining and cored mass; and heating said mass to the temperature necessary for the reaction, by conducting an electric current through said mass during its penetration by the nitrogen-containing gas.

22. A process of making aluminum nitrid, which comprises forming a mixture comprising relatively finely comminuted bauxite and coke or coal, in the proportions of about 100 pounds of bauxite and about 50 pounds of bituminous coal, into a self-sustaining and electrically conductive porous mass, by mixing therewith about 10 pounds of powdered pitch, and electrically heating said mixture; coring said mixture; causing a nitrogen-containing gas to penetrate said self-sustaining and cored mass; and heating said mass to the temperature necessary for the reaction by conducting an electric current through said mass during its penetration by the nitrogen-containing gas.

23. A process of making aluminum nitrid, which comprises heating a loosely poured charge comprising a suitable aluminous material and coke or coal, mixed in suitable proportions, and a suitable proportion of tar or pitch, to render said charge self-sustaining; causing a nitrogen-containing gas to penetrate said charge; and further heating of the charge to the temperature necessary for the production of aluminum nitrid.

24. In a process involving chemical reactions, by the aid of heat engendered by passing an electric current through a mixture of the bodies that are to react, the step which consists in rendering said normally electrically non-conductive mixture electrically conductive by uniformly distributing an electric current through a resistor surrounding said mixture, so as uniformly to heat the latter.

In testimony whereof, I have signed my name to this specification.

WILLIAM HOOPES.